United States Patent
Farcasiu

(10) Patent No.: US 7,184,801 B2
(45) Date of Patent: Feb. 27, 2007

(54) MOBILE APPLICATION BUILDER

(75) Inventor: Alexandru M. Farcasiu, Southlake, TX (US)

(73) Assignee: Good Technology, Inc., Santa Clara, CA (US)

( * ) Notice: Subject to any disclaimer, the term of this patent is extended or adjusted under 35 U.S.C. 154(b) by 499 days.

(21) Appl. No.: 10/436,298

(22) Filed: May 12, 2003

(65) Prior Publication Data
US 2004/0229654 A1   Nov. 18, 2004

(51) Int. Cl.
H04B 1/38   (2006.01)
(52) U.S. Cl. ............... 455/575.1; 455/90.3; 455/566; 455/412.1; 455/414.1; 455/557; 455/461; 715/866; 715/516; 701/10; 701/4; 701/6
(58) Field of Classification Search ............. 455/412.1, 455/414.1, 557, 575.1, 90.3; 707/4, 6, 10; 715/866, 516, 764; 326/38; 345/619
See application file for complete search history.

(56) References Cited

U.S. PATENT DOCUMENTS

| | | | |
|---|---|---|---|
| 5,671,436 A * | 9/1997 | Morris et al. ............... 707/10 |
| 6,092,114 A * | 7/2000 | Shaffer et al. .............. 709/232 |
| 6,124,855 A * | 9/2000 | Sells ........................... 715/866 |
| 6,182,129 B1 * | 1/2001 | Rowe et al. ................ 709/221 |
| 6,201,539 B1 * | 3/2001 | Miller et al. ................ 715/866 |
| 6,243,088 B1 * | 6/2001 | McCormack et al. ....... 715/866 |
| 6,243,774 B1 * | 6/2001 | Eide et al. .................. 710/302 |
| 6,249,794 B1 * | 6/2001 | Raman ....................... 715/500 |
| 6,694,359 B1 * | 2/2004 | Morris et al. ............... 709/219 |
| 6,757,530 B2 * | 6/2004 | Rouse et al. ............. 455/412.1 |
| 6,901,572 B1 * | 5/2005 | Dougherty et al. ........... 716/17 |
| 6,947,943 B2 * | 9/2005 | DeAnna et al. ............. 707/100 |

* cited by examiner

Primary Examiner—Marceau Milord
(74) Attorney, Agent, or Firm—Blakely, Sokoloff, Taylor & Zafman, LLP

(57) ABSTRACT

A method and system which allow a user to define and edit workflow applications for a mobile device, screens associated with the applications, and workflow process is described. The states or schemas for these applications may be stored as records in databases.

20 Claims, 5 Drawing Sheets

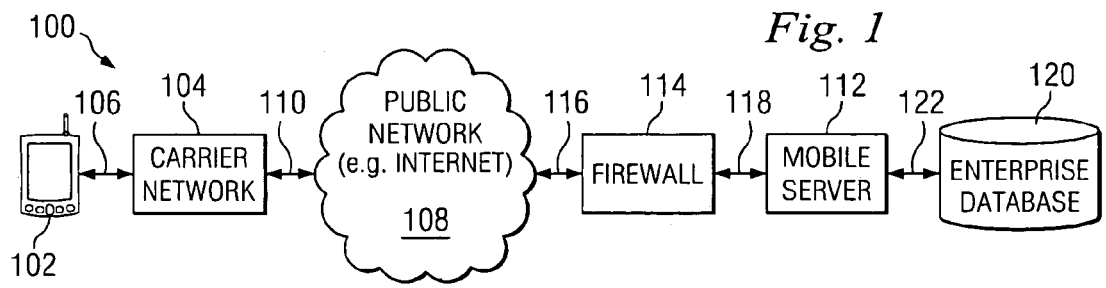
Fig. 1
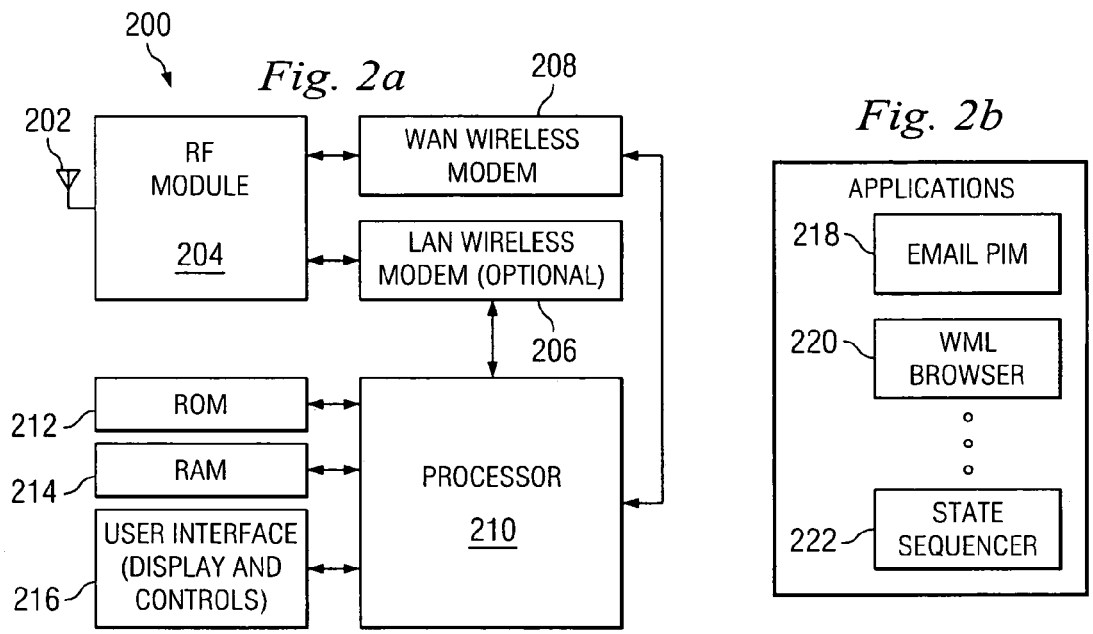
Fig. 2a
Fig. 2b
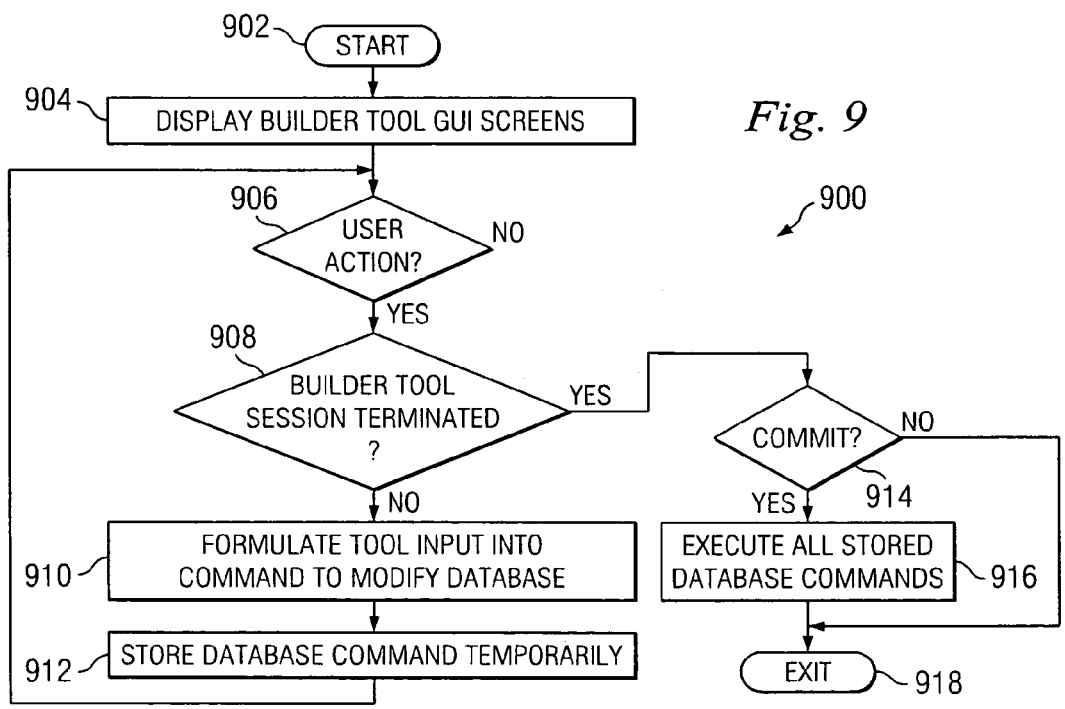
Fig. 9

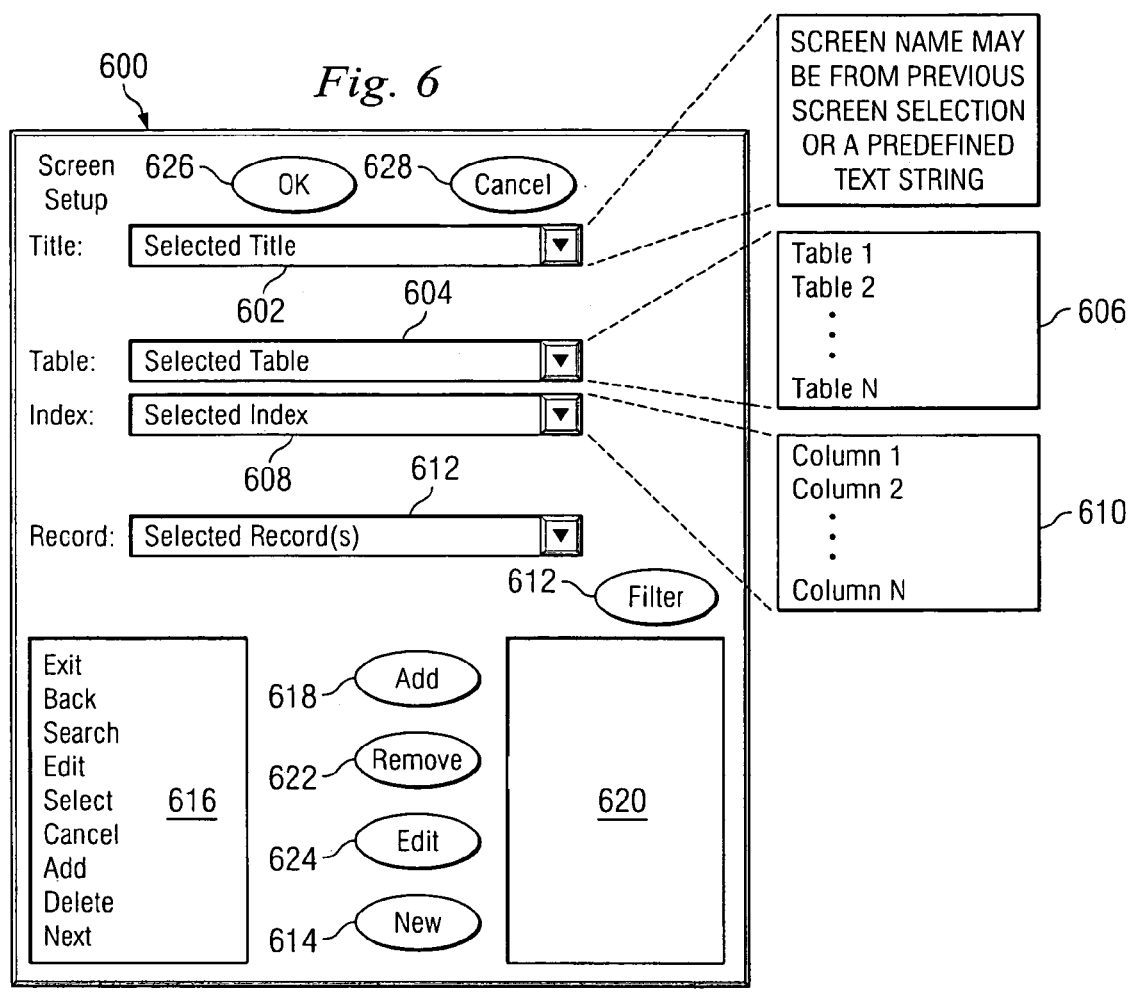
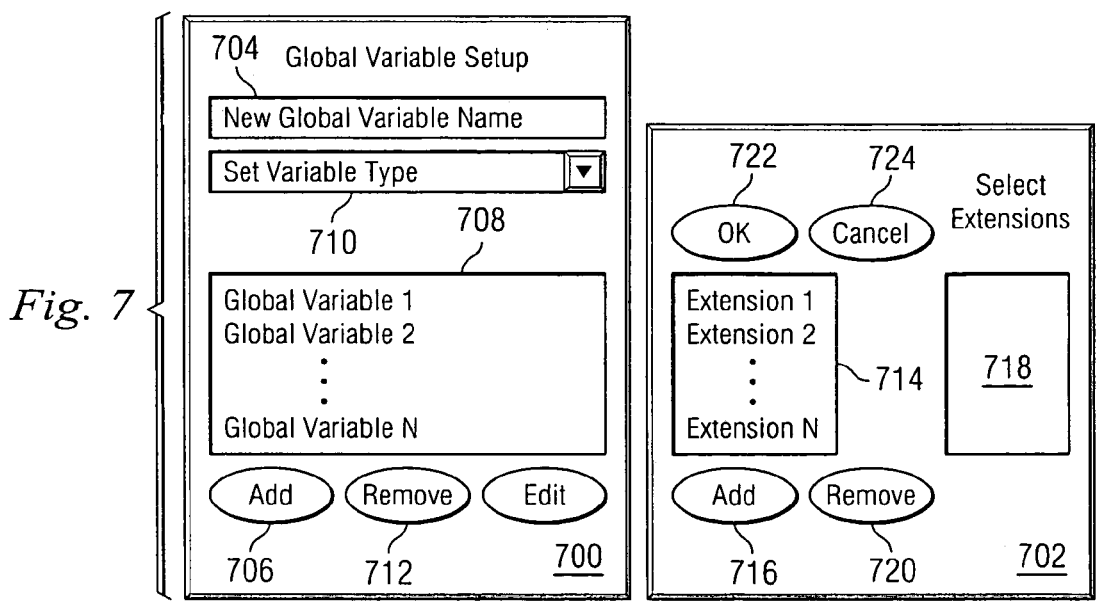

MOBILE APPLICATION BUILDER

TECHNICAL FIELD

The invention relates in general to computer systems and in particular to a mobile application builder.

BACKGROUND INFORMATION

Intelligent mobile devices including personal digital assistants ("PDA"s), smart phones, and small hand-held computers are becoming more common. Use of these mobile devices is no longer limited to technologically savvy professionals. Increasingly these devices are being integrated into mass business processes such as parcel delivery, service calls and other applications.

In practice it has been found that enterprises which deploy mobile applications to their employees via mobile intelligent devices may need to have special features added to the mobile applications to support their particular business needs. While some enterprises may be ready to commission a fully customized application for their special needs, many enterprises want small modifications which may not justify the cost of such a fully customized application. It may be inefficient for a software developer employed by the mobile application vendor to make these small modifications. Furthermore, deploying these small modifications may require transmitting the whole updated application across the limited wireless resource, which is inefficient when the change only affects a small portion of the application.

What is needed, therefore, is a system and method for structuring mobile applications which allows enterprises to customize their applications and make changes within their workflow applications without having to hire computer programmers to modify the code for these applications.

SUMMARY OF THE INVENTION

The previously mentioned needs are fulfilled by the present invention. Accordingly there is provided embodiments of a method and system which allow a user to define and edit workflow applications for a mobile device, screens associated with the applications, and workflow process. The states or schemas for these applications may be stored as records in databases.

BRIEF DESCRIPTION OF THE DRAWINGS

FIG. 1 depicts an exemplary system for implementing various embodiments of the present invention.

FIG. 2 depicts an exemplary mobile server.

FIG. 2 depicts an exemplary mobile device.

FIG. 6 depicts an exemplary GUI for setting up display screens associated with sub-applications.

FIG. 7 depicts an exemplary GUI for setting up global variables associated to sub-applications and an exemplary GUI for selecting precompiled software modules called extensions to be associated to sub-applications.

DETAILED DESCRIPTION OF THE INVENTION

Figure 3:
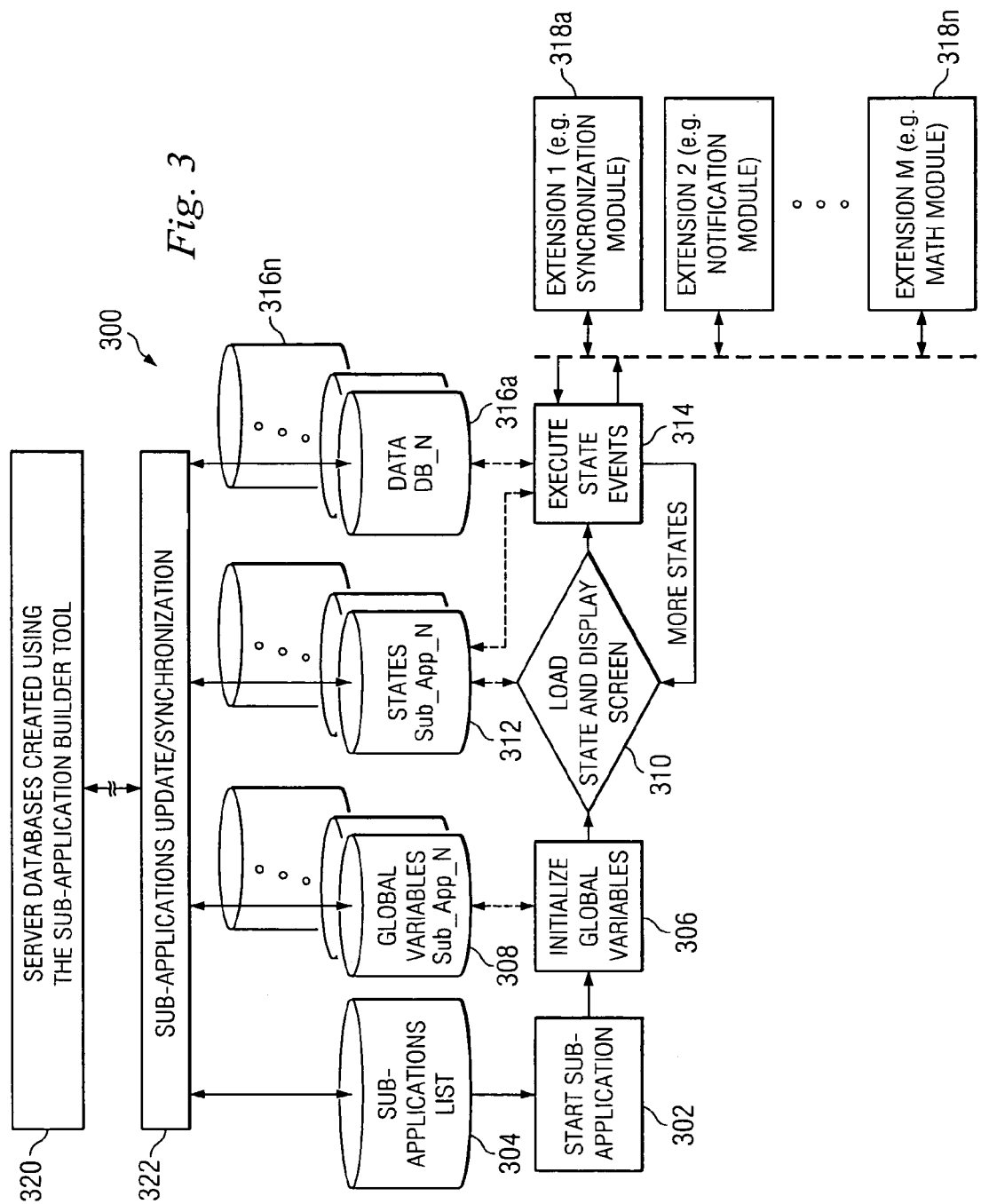
FIG. 3 depicts an exemplary architecture of a state-sequencer application sequencing mobile applications restructured as databases.

The present invention provides a unique method and system for structuring a multiplicity of mobile applications to execute as a series of states in a database which can be sequenced by a single state processing application. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Turning now to FIG. 1, an exemplary communication system and network 100 is shown which might be used to implement various embodiments of the present invention. A mobile intelligent device 102 is shown in wireless communication with a carrier network 104 via a radio frequency ("RF") link 106. The carrier network 104 may be a cellular network and might include such components as base station transmitter systems ("BTS") which communicate with mobile devices within their cell areas via RF communications links using a standard cellular phone air interface protocol, Base Station Controllers ("BSC") which perform various intelligent control functions for the BTSs, and mobile switching centers ("MSC") which route voice and data traffic onto and off of the public switched telephone network ("PSTN"). The carrier network may be in communication with a public network 108, such as the Internet, via a high speed connection 110. A mobile server 112 may be in communication with the public network 108 via a corporate firewall 114 over high speed connections 116 and 118. The mobile server 112 may execute applications supporting services for mobile devices, services which may include synchronizing data between an enterprise database 120 and the mobile 102. The enterprise database 120 may be in communication with the mobile server 112 via a high speed connection 122.

Turning now to FIG. 2a, there is presented a simplified block diagram of one embodiment of an exemplary mobile intelligent device 200. In this illustrative embodiment, an RF antenna 202 is connected to an RF module 204. The antenna 202 receives and transmits communications signals. The RF module 204 converts base band information into an RF format and amplifies the signal to a power level suitable to transmission and converts received RF signals to base band information suitable to processing within the mobile 200. The RF Module 204 may be connected to an optional local area network ("LAN") wireless modem 206 and/or to a wide area network ("WAN") wireless modem 208. The optional LAN wireless modem 206 and WAN wireless modem 208 are in communication with a processor 210. The optional LAN wireless modem 206 receives signals from the processor 210 which it modulates and sends to the RF module 204. The optional LAN wireless modem 206 receives signals from the RF module 204 which it demodulates and sends to the processor 210. The WAN wireless modem 208 receives signals from the processor 210 which it modulates and sends to the RF module 204. The WAN wireless modem 208 receives signals from the RF module 204 which it demodulates and sends to the processor 210.

In the illustrative embodiment, the processor 210 controls the basic operations of the mobile intelligent device 200. The processor 210 may be coupled to one or more memory devices, such as random access memory "RAM" 214. The RAM 214 may be used for the temporary storage of data used in processing signals and the operation of the intelligent mobile device 200. In some embodiments, the processor 210 reads instructions, such as processing and operating logic from a set of read-only memory "ROM" 212. In other embodiments, ROM 212 could be flash memory or another non-volatile form of memory and the processor 210 may be one or more processors or circuits. A user interface 216 provides a display and control inputs. The user interface 216 may be in communication with the processor 210 by a plurality of electrical conductors which permit the processor 212 to control the display and to receive inputs.

Turning now to FIG. 2b, the processor 210 may execute a number of computer programs, called "applications," which may include an email PIM 218 application or a micro browser 220 application. A state processor or state sequencer program 222 may also be loaded and executed by the processor 210. In several exemplary embodiments, the state sequencer 222 manages states, e.g., loading a state, transitioning to a new state, responding to events while a given state prevails. Additionally, the state sequencer 222 may also perform other processing activities unrelated to state processing as well.

Turning now to FIG. 3, a hybrid illustration of the architecture 300 using a state sequencer 222 and associated data structures is shown. This is said to be a hybrid illustration because it combines the depiction of an exemplary functional flow with the depiction of exemplary structural elements such as databases and precompiled computer programs. In several exemplary embodiments, the state sequencer 222 provides a means for the user to select an application from a list stored in a Sub-applications List database 304, such as a workflow. Upon selection, the sub-application may be started in step 302. In step 306, the state sequencer 222 then initializes any global variables associated with the selected sub-application by accessing a database 308 containing the global variables for that application. In some exemplary embodiments, there may be more than one global variable database—each associated with a specific sub-application. In step 310, the state sequencer 222 may then load the state of the sub-application from a state application database 312 which stores states of specific sub-applications and displays the appropriate sub-application screen on the mobile. In some exemplary embodiments, there may be multiple state application databases 312, one database dedicated to each sub-application. These states may define the complete content of sub-application display windows on the mobile 102. Thus, a state may correspond to a display, and transitioning from one state to another implies replacing the sub-application's display window content with different content. For example, a screen is said to be a "state," and the states database associated with a given sub-application is said to have states represented by records in the database.

Thus, the state loaded in 310 may define both the information content to be displayed in the sub-application's screen and that screen's interaction capabilities and dependent behaviors. When the mobile user takes some action—for example acknowledges completion of a workflow task—the state sequencer may then execute the state events in step 314. Executing state events may include replacing the current state with a different state loaded from the appropriate dedicated States database 312 and, consequently, displaying a different sub-application screen (recall that each state defines a different screen for the sub-application and that loading a new state implies replacing the previous screen with a different screen defined by the new state); reading or writing data in a Data database 316a–316n; executing a separate precompiled computer program 318a–318n, which may be subroutine or extension. Such extensions could be a synchronization module, a notification module, or a math module. The multiple Data databases 316a–316n may comprise databases for the sub-applications, some of which may be shared and used in common by several sub-applications and some of which may be used only by one sub-application.

The state sequencer 222 may offer the mobile user the capability to enter inputs to support pausing or immediate termination of the selected sub-application and other controls. The sub-applications may be customized or defined using a visual Mobile Sub-application Builder tool 320. Thus, a user may employ the tool to define sub-applications and their behavior as content in databases residing in the enterprise network. The content of these databases may be pushed out to associated mobiles during the execution of normal server to client data synchronization programs 322. Such synchronization may cause new sub-applications and sub-applications modifications to be deployed on the mobiles.

An exemplary mobile application program that would be amenable to the architecture illustrated in FIG. 3 may be a workflow program which provides the user of the mobile 102 with a display of tasks to be accomplished in a specific order, with a means to acknowledge completion of a task, with a means to advance to a next group of tasks, with a means to back-up to a previous group of tasks, etc.

For instance, consider the following sequence of tasks associated with a possible cable television service call.

(1) Park service truck
(2) Block truck wheels
(3) Attempt to contact customer
(4) Identify service drop to customer premises
(5) Test cable signal upstream of service drop A workflow program associated with this sequence of tasks may display each of these steps with an indicator such as a flashing arrow to point out the first step. Each step may provide an acknowledgement operation which when activated while the step is indicated would then cause the indicator to move to the next step. The acknowledgement need not be a simple one-shot selection, it could be alternate indicators. For example the acknowledgement for the exemplary step 5 above may allow the mobile user to acknowledge by indicating the tested status of the upstream cable signal by activating "PASS" or by activating "FAIL." If PASS is activated, a subsequent group of tasks appropriate to the passing condition of the upstream cable may be displayed, while if FAIL is activated an alternate subsequent group of tasks appropriate to the failed condition of the upstream cable signal may be displayed.

Other workflows may be wholly or partly articulated through a similar finite sequence of tasks. Sequence of acknowledgements of a whole service call workflow session may be recorded in the mobile's data storage and then uploaded over wireless communications links to the enterprise's home office to enable service call quality evaluation.

The workflow application sequence may be structured as a sequence of rows in a database table, each row corresponding to a task to be completed. Each row could contain free field text describing the task that may be displayed, a variable length list of acknowledgement actions for this free field text including the prompt text associated with each acknowledgement action and the behavior of the acknowledgement, an optional free text input action, etc. The state sequencer 222 may read through any appropriately formatted workflow database tables and sequence the mobile user through the workflow tasks. Additionally, the state sequencer may be directed to data or in additional database tables which could form sub-work flow applications.

Several different workflows could be available in separate files or databases. One advantage of storing the workflows in databases as opposed to programming computer code is the ease which the work flow applications may be modified. For instance, in the above example, if the enterprise decides to change the workflow to incorporate a new step between step 2 and step 3, in which the employee is to call to the home office after parking and securing his truck and before contacting the customer, it is only necessary to update the database containing the old workflow table by adding a record between the workflow record 2 and record 3.

Workflows may be set up through a series of visual tools. Exemplary embodiments of input screens from such a tool are depicted in FIG. 4, FIG. 6, FIG. 7, and FIG. 8 which collectively illustrate an exemplary suite of display windows which together may be used to define sub-applications.

Figure 4:
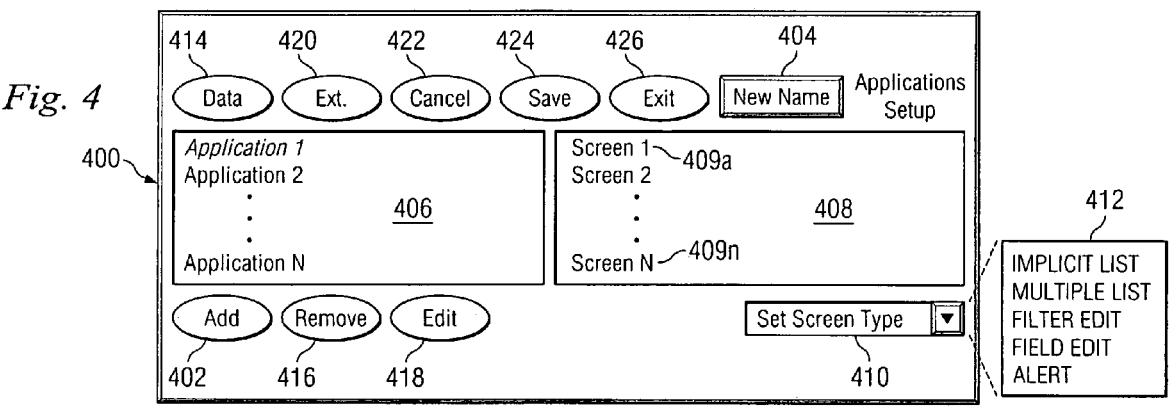
FIG. 4 depicts an exemplary GUI for setting up sub-applications.

Turning now to FIG. 4, one embodiment of an Applications setup GUI window 400 is depicted. In several exemplary embodiments, to define a new application, the user selects an "Add" indicator 402. (In this example, it is assumed that the user has administration privileges which will allow the user to create, modify or delete applications.)

The user may then enter the name of the new application in a text box 404. In response, the new name will appear in a list of applications in the application window 406. The user may select a sub-application from the list 406. In FIG. 4, the selection is indicated by putting the name "Application 1" in italics. If the user selects a screen box 408 he may add data input or workflow screens 409a to 409n to the currently selected Application by pressing the Add indicator 402. He may also enter the name of the new screen in the text box 404. The user may select the screen type from the list 408 by activating a Set Screen Type drop down 410. In the exemplary embodiment, this list displays a menu of screen types 412 from which the user may select the desired screen type. The user may also define the databases and the database fields to be associated with this set of applications by selecting a Data indicator 414. The user can add data sources, and from a list of sources he can select the tables to be synchronized and/or downloaded.

In some embodiments, the user may remove either a screen associated with a sub-application or may remove an entire sub-application by pressing a Remove indicator 416. Additionally, the user may edit the name of a selected application or move to the screen setup by pressing an Edit indicator 418.

In several exemplary embodiments, the user may associate sub-applications or functions to be associated with the application by pressing an "Extension" indicator 420. In some embodiments, the user may cancel out of the current screen by pressing a "Cancel" indicator 422, or he may save his results to a state database by pressing the "Save" indicator. The user may also exit the screen 400 by pressing the "Exit" indicator 426.

Figure 5:
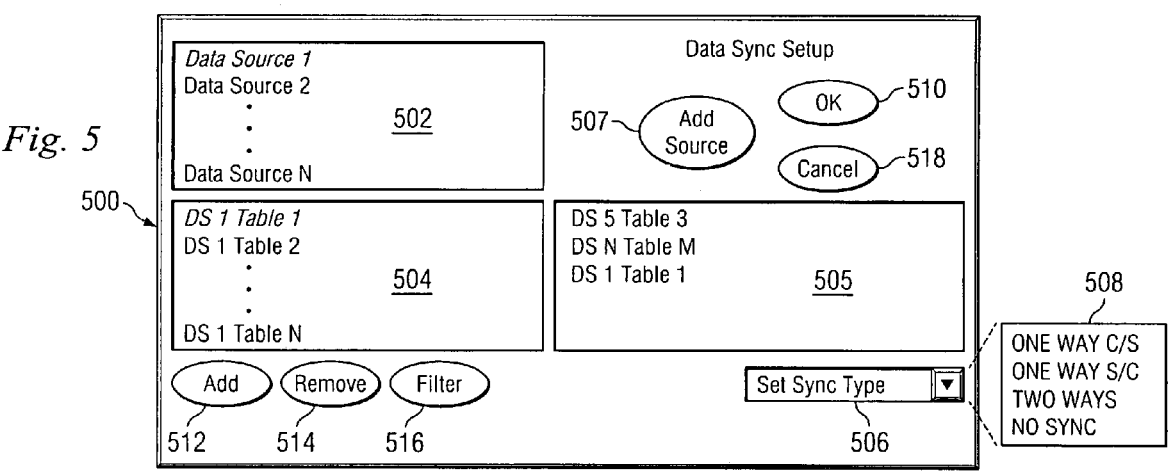
FIG. 5 depicts an exemplary GUI for setting up database table synchronization type.

Turning now to FIG. 5, there is illustrated one embodiment of a database synchronization GUI window 500. A list of data sources may be displayed in a data source window 502. When the user selects one of these sources, a list of tables associated with the selected data source may be displayed in a table display window 504. A list of sub-tables or attributes for each table may be displayed in the attribute window 505. The user may then select one of these tables, sub-tables or attributes. The "Add Source" indicator 507 allows the user to add a new data source for the application.

The user may also set the synchronization type that will apply for this table, sub-table or attribute by activating the "Set Sync Type" pull-down menu indicator 506 which will cause a drop-down menu 508 listing the synchronization options available. The exemplary list shown in FIG. 5 includes One Way C/S (the client pushes data to the server only), One Way S/C (the server pushes data to the client only), Two Ways (the client pushes its changes to the server, and the server pushes its changes to the client), and No Sync. In several exemplary embodiments other functions are available, such as an "Add" indicator 512, a "Remove" indicator 514, and a "Filter" indicator 516. The filter indicator allows the user to selectively synchronize the data with the enterprise database. An "OK" indicator 510 allows the user to save the state, and a "Cancel" indicator 518 allows the user to exit without changing the state database.

Turning now to FIG. 6, an exemplary screen setup GUI window 600 is depicted to allow users to associate screens with the applications. The user may select the screen to be setup by selecting a Selected Title drop-down menu indicator 602 and then selecting from a string passed by a previous screen or enter a new text string. The user may associate tables with the selected screen by selecting a Selected Table drop-down menu indicator 604 and then selecting from a list of tables 606 which displays the tables selected in reference to the Data Sync Setup screen illustrated in FIG. 5. The user may select a table attribute or column by selecting a Selected Index drop-down menu indicator 608 and then selecting from a list of table fields 610 which displays. The user may select a record in the table by selecting a Selected Record drop-down menu indicator 612 which will display a list of all records in the selected table.

In several exemplary embodiments, the "Filter" indicator 612 allows the user to enter filter criteria that determine the attributes or records to be included on the screen. In some embodiments, this filter selects from records that are already on the device (vs. the filter on the Data Sync Setup that determines the records to be synchronized to the device). In some embodiments, a "New" indicator 614 opens a new screen that allows the user to create a new indicator and associate the indicator with a specific functionality (eventually by linking the indicator to an extension.)

Many mobile devices can be controlled through key commands that are available on the keypad of many mobile devices. The window 616 displays a list of the available command buttons or keys for a mobile device. These command keys have standard functionality: Exit, Back which might control aspects of the application. Additionally, a keypad key may be associated to an extension or function. In several exemplary embodiments, an "Add" indicator may allow the user to select from the list of existing indicators in the window 616 to the indicators to be included on the current screen (which are displayed in window 620. The "Remove" indicator 622 takes the indicators off the list displayed in window 620. The "Edit" indicator 624 allows the user to alter the key or button properties. The "OK" indicator 626 allows the user to exit and save the changes in the appropriate database. The "Cancel" indicator 628 allows the user to exit without saving the changes.

Turning now to FIG. 7, exemplary examples of a Global Variable Setup GUI window 700 and Select Extensions GUI window 702 are depicted. The user may define a new global variable name by typing a name into a text box 704 and activating an Add button 706. In several exemplary embodiments, the user may select an existing global variable name using in a list window 708. The user may set or modify the variable type of the selected global variable by activating a Set Variable Type drop-down menu button 710 and selecting from the list of variable types which will be displayed on the list. In some embodiments, the user may remove a global variable from a sub-application by activating a Remove button 712.

The GUI window 702 allows a user to associate a pre-compiled software module, called an extension, to the sub-application by selecting from a list of extensions 714 and activating an Add button 716. The added extension will be displayed in a display window 718. To remove an extension from association with the sub-application, the user may select the extension in the display window 718 and then activate a Remove button 720. The "OK" indicator 722 allows the user to exit and save the changes in the appropriate database. The "Cancel" indicator 724 allows the user to exit without saving the changes.

Figure 8:
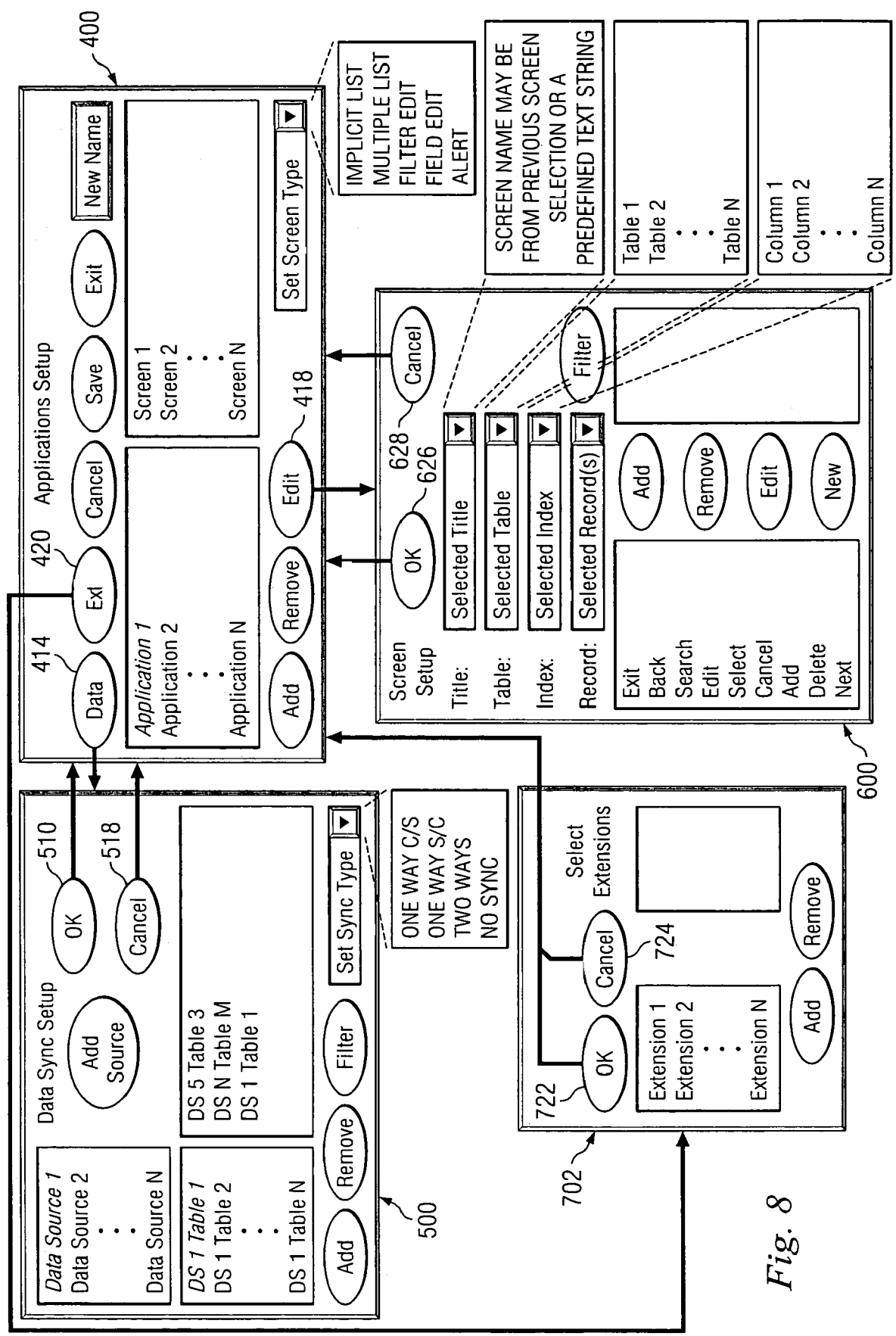
FIG. 8 depicts an exemplary process for building or modifying sub-applications using the Sub-application Builder tool.

Turning now to FIG. 8, there is a relationship diagram showing an exemplary inter-relationships between the exemplary GUI windows 400, 500, 600, and 702. For instance, pressing the "Ext" indicator 420 in Window 400 may bring up the Window 702. In the Window 702, pressing the "OK" indicator 722 or the "Cancel" indicator 724 takes the user back to the Window 400. Pressing the "Data" indicator 422 in Window 400 may bring up the Window 500. In the Window 500, pressing the "OK" indicator 510 or the "Cancel" indicator 518 takes the user back to the Window 400. Similarly, pressing the "Edit" indicator 418 in Window 400 may bring up the Window 600. Pressing the "OK" indicator 626 or the "Cancel" indicator 628 takes the user back to the Window 400.

Turning now to FIG. 9 a flow diagram 900 depicts an exemplary process for building or modifying sub-applications using the Sub-application Builder Tool discussed in reference to FIGS. 4 through 7. The process starts at step 902 when the user starts the tool application. The process flows to step 904 in which the tool displays the several GUI screens 400, 500, 600, and 700 to the user. The process flows to step 906 in which the tool waits for the user to enter some input into one or another of the screens, and when input is entered the process flows to step 908 where a decision is made. If the builder tool session is not terminated, the process flows to step 910 in which the tool input is formulated by the tool application program as a command to modify one of the databases associated with the state sequencer application.

As discussed previously, the sub-applications may be defined as records in databases, and these commands, when executed, may cause new sub-applications to be defined or cause existing sub-applications to be modified. The process flows to step 912 in which the database command is stored temporarily. The process flows back to step 906 and waits for further user input.

At step 908, if the tool session is terminated the process flows to step 914 where a decision is made. If the terminating user action stipulates that the database change commands accumulated during the sub-application builder tool session are to be committed to the databases, the process flows to step 916 in which all the accumulated database change commands are executed, thus changing the databases. When the mobile device 102 synchronizes with the enterprise database 120, sub-application behaviors based on these modifications will be deployed to these mobile devices 102. The process then exits in step 918. At step 914, if the terminating user action does not commit the database change commands accumulated during the sub-application builder tool session, the process does not execute these accumulated commands and terminates without altering the enterprise database 120. This is only one example of the process flow which may be supported by the sub-application builder tool program or application.

To aid in understanding the operation of the sub-application builder tool and associated GUIs, a few builder tool use cases are presented below. Again, the linkage between the Mobile Sub-application Builder tool and the behavior and functionality of the mobiles is pointed out. Using the builder tool to add sub-applications or modify existing sub-applications in the enterprise databases has the effect, through the normal data synchronization process, of causing the mobiles to exhibit new behavior and support new functionality when these database changes are synchronized with the mobiles.

The builder tool user starts the sub-application builder tool program. The Sub-applications Setup screen 400 is presented inside the builder tool window. The tool user wants to change the manner of address book data synchronization from two-way synchronization—changes in the server address book data base flow out to the multiple clients, and changes in the client address book data base flow in to the server—to one way synchronization from the server out to the multiple clients. The user activates the Data button 414, and the Sync Setup screen 500 displays. The user selects the Customer Address Book data source from the list of data sources 502 by clicking on this text line. The line highlights. The database tables associated with the Customer Address Book database are then displayed in the table list 504. The user clicks on the Set Sync Type drop-down button 506 and the drop-down menu list of synchronization modes 508 displays, with the currently selected synchronization mode "Two Ways" highlighted. The user clicks the "One Way S/C" menu option, and the Sync Setup screen 500 disappears. The appropriate flag in the synchronization configuration databases which control both server and client Customer Address Book synchronization behavior is updated. The change will become effective when the clients resynchronize their data. The user selects the exit button in the upper right of the sub-applications builder tool GUI window and the tool program terminates.

Several advantages can be seen to flow from the several embodiments of the present invention. An embodiment of one aspect of the invention supports shared access to databases and to extensions for sub-applications, thus conserving limited mobile memory. Since sub-applications may be defined as content in databases, sub-application updates may be deployed as minimum delta database updates in some embodiments of the invention, thus conserving wireless capacity. Since the state sequencer may control the sub-applications, unified management of sub-applications may be enabled in some embodiments of the invention.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims. In the claims, means-plus-function clauses are intended to cover the structures described herein as performing the recited function and not only structural equivalents, but also equivalent structures.

What is claimed is:

1. A mobile device comprising:
    a processor;
    one or more applications executed by the processor;
    an application builder to enable a user of the mobile device to generate a new application by modifying operation of a first application of the one or more applications; and
    a state sequencer to facilitate transmission of data and operations associated with the new application during synchronization with a mobile server.

2. The mobile device of claim 1 further comprising a display screen to display a displaying a graphical user interface (GUI) including one or more indicators to define operation of the new application.

3. The mobile device of claim 2 wherein the GUI comprises:
    a first indicator to define a database to be associated with the new application; and
    a second indicator to add data sources for the new application.

4. The mobile device of claim 3 wherein the GUI further comprises a third indicator to enable the user to associate a function with the application.

5. The mobile device of claim 2 wherein the GUI includes a synchronization GUI to enable the user to select one or more databases at the mobile server to transfer during synchronization with the mobile server.

6. The mobile device of claim 5 wherein the synchronization GUI includes a menu of synchronization options for synchronizing with the mobile server.

7. The mobile device of claim 2 wherein the GUI includes a global variable setup GUI to enable the user to define one or more global variables for the new application.

8. The mobile device of claim 7 wherein the global variable setup GUI includes a menu to enable the user to set a variable type for a global variable.

9. A system comprising:
    a mobile server;
    a database coupled to the mobile server; and
    a mobile device communicatively coupled to the mobile server having:
        one or more applications;
        an application builder to enable a user of the mobile device to generate a new application by modifying operation of a first application of the one or more applications; and
        a state sequencer to facilitate synchronization with the mobile server and to transmit data and operations associated with the new application to the database via the mobile server.

10. The system of claim 9 wherein the mobile device further comprises a display screen to display a displaying a graphical user interface (GUI) including one or more indicators to define operation of the new application.

11. The system of claim 10 wherein the GUI comprises:
    a first indicator to define a database to be associated with the new application; and
    a second indicator to add data sources for the new application.

12. The system of claim 11 wherein the GUI further comprises a third indicator to enable the user to associate a function with the application.

13. The system of claim 10 wherein the GUI includes a synchronization GUI to enable the user to select one or more databases at the mobile server to transfer during synchronization with the mobile server.

14. The system of claim 13 wherein the synchronization GUI includes a menu of synchronization options for synchronizing with the mobile server.

15. The system of claim 10 wherein the GUI includes a global variable setup GUI to enable the user to define one or more global variables for the new application.

16. The system of claim 15 wherein the global variable setup GUI includes a menu to enable the user to set a variable type for a global variable.

17. The system of claim 9 further comprising a second mobile device having a state sequencer to facilitate synchronization with the mobile server and to receive the data and operations associated with the new application from the database via the mobile server.

18. A method comprising:
    a user of a mobile device generating a new application program by modifying operation of a first application stored at the mobile device, wherein modifying operation of the first application comprises adding data input or workflow screens to the first application; and
    synchronizing data between the mobile device and a mobile server; and
    transmitting data and operations associated with the new application to a database coupled to the mobile server.

19. The method of claim 18 device further comprising displaying a graphical user interface (GUI) including one or more indicators to define operation of the new application.

20. The method of claim 19 further comprising:
    displaying a first indicator to define a database to be associated with the new application; and
    displaying a second indicator to add data sources for the new application.

* * * * *